US012583052B2

(12) United States Patent
Hölzl et al.

(10) Patent No.: US 12,583,052 B2
(45) Date of Patent: Mar. 24, 2026

(54) METHOD FOR CONNECTING FERRITIC WITH AUSTENITIC STEEL PIPES

(71) Applicant: Linde GmbH, Pullach (DE)

(72) Inventors: Reinhold Hölzl, Pullach (DE); Matthias Grundwürmer, Pullach (DE); Thomas Englert, Pullach (DE); Josef-Andreas Pöllmann, Pullach (DE)

(73) Assignee: LINDE GMBH, Pullach (DE)

( * ) Notice: Subject to any disclaimer, the term of this patent is extended or adjusted under 35 U.S.C. 154(b) by 199 days.

(21) Appl. No.: 18/259,216

(22) PCT Filed: Dec. 1, 2021

(86) PCT No.: PCT/EP2021/025478
§ 371 (c)(1),
(2) Date: Jun. 23, 2023

(87) PCT Pub. No.: WO2022/144090
PCT Pub. Date: Jul. 7, 2022

(65) Prior Publication Data
US 2024/0316684 A1       Sep. 26, 2024

(30) Foreign Application Priority Data

Dec. 30, 2020     (EP) .................................... 20020656

(51) Int. Cl.
*F28D 7/10*          (2006.01)
*B23K 20/08*        (2006.01)
(Continued)

(52) U.S. Cl.
CPC .......... *B23K 20/085* (2013.01); *B23K 20/227* (2013.01); *B23K 33/006* (2013.01);
(Continued)

(58) Field of Classification Search
CPC ................ B23K 20/085; B23K 20/227; B23K 33/006; B23K 2103/04; B23K 2101/14; F28D 7/106; F28F 21/082
(Continued)

(56) References Cited

U.S. PATENT DOCUMENTS 4,897,908 A     2/1990  Henriksson
2008/0202732 A1   8/2008  Gillessen et al.

FOREIGN PATENT DOCUMENTS

CN      112122865 A    12/2020
EP       0661126 A1    7/1995
(Continued)

OTHER PUBLICATIONS

Kapil Angshuman, et al., "Magnetic pulse welding: an efficient and environmentally friendly multi-material joining technique", Journal of Cleaner Production, vol. 100, Aug. 1, 2015 (Aug. 1, 2015), pp. 35-58, XP055886846, Amsterdam, NL ISSN: 0959-6526, DOI: 10.1016/j.jclepro.2015.03.042.

*Primary Examiner* — Davis D Hwu
(74) *Attorney, Agent, or Firm* — Millen, White, Zelano & Branigan, P.C.; Brion P. Heaney

(57) ABSTRACT
Provided is a method of connecting an austenitic steel pipe with a ferritic steel pipe. The method comprises providing the austenitic steel pipe and the ferritic steel pipe, such that an inner end section of the austenitic steel pipe has an outer diameter smaller than an inner diameter of an outer section of the ferritic steel pipe, inserting the inner end section into the outer end section, such that the inner and outer end sections overlap in a connection region, and welding the inner and outer end sections in the connection region by explosive welding or magnetic pulse welding. Further, a linear quench exchanger and a processing arrangement for processing a process fluid are provided.

18 Claims, 3 Drawing Sheets

(51) Int. Cl.

| | | |
|---|---|---|
| *B23K 20/227* | (2006.01) | |
| *B23K 33/00* | (2006.01) | |
| *F28F 21/08* | (2006.01) | |
| *B23K 101/14* | (2006.01) | |
| *B23K 103/04* | (2006.01) | |

(52) U.S. Cl.

CPC ............ *F28D 7/106* (2013.01); *F28F 21/082* (2013.01); *B23K 2101/14* (2018.08); *B23K 2103/04* (2018.08)

(58) Field of Classification Search

USPC ......................................................... 165/154

See application file for complete search history.

(56) References Cited

FOREIGN PATENT DOCUMENTS

| | | | |
|---|---|---|---|
| EP | 2813594 A1 | | 12/2014 |
| EP | 3355018 A1 | | 8/2018 |
| JP | S63 61888 A | | 3/1988 |
| JP | H0771665 A | * | 3/1995 |
| JP | 2001241883 A | | 9/2001 |
| JP | 2018031346 A | * | 3/2018 |

* cited by examiner

52

54

56

58

60

62

METHOD FOR CONNECTING FERRITIC WITH AUSTENITIC STEEL PIPES

The present invention concerns a method of connecting an austenitic steel pipe with a ferritic steel pipe, a linear quench heat exchanger and a processing arrangement.

PRIOR ART

In the petrochemical industry steam cracking is used to break down saturated hydrocarbons, such as naphtha, liquefied petroleum gas, ethane, propane or butane into lighter hydrocarbons, such as lighter alkenes, including ethene and propene. During this process the process fluid is typically passed through furnace coils and pipes of a steam cracking furnace and is heated to temperatures above 500° C., often above 700° C. or 800° C., in order to initiate the desired chemical reaction. Due to these high temperatures the furnace coils are made of a highly heat resisting material, particularly of an austenitic steel.

After the chemical reaction, the cracked gas that leaves the steam cracking furnace can have a temperature of more than 700° C. and needs to be cooled down (quenched) at a high rate. To that end so-called 'linear quench exchangers' are utilised, which are designed as double pipe heat exchangers. A cooling fluid, typically water, is flowing in the space between the inner and outer pipes and the cracked gas is guided through the inner pipe, i.e. the inner pipe is connected to an outlet pipe of the furnace. As material for the double pipe ferritic steel materials are used, leading to a connection between two different steel materials.

In the connection zone different temperatures (due to the cooling with the cooling fluid) and different coefficients of thermal expansion (due to the different materials) lead to increased stress, which in turn can lead to formation of cracks. Additionally, from the side of the cracking furnace, coking can induce stress into the connection zone. On the side of the double pipe, coarse graining of the ferritic steel can occur, as the temperature in the connection zone cannot always be precisely controlled. These effects can lead to increased wear and breakdown of the connection between the austenitic and ferritic pipes, which finally may require a time-intensive and costly repair during which steam cracking operation has to be stopped. Therefore, an objective of the present invention is to provide a connection between austenitic and ferritic steel pipes that is reliable under high temperature conditions, and more specifically that is reliable in transition zones in which a temperature drop from high temperature to lower temperature takes place.

DISCLOSURE OF THE INVENTION

Provided are a method of connecting an austenitic steel pipe with a ferritic steel pipe, a linear quench heat exchanger and a processing arrangement according to the independent claims. Dependent claims relate to preferred embodiments.

The method of connecting an austenitic steel pipe with a ferritic steel pipe according to the present invention comprises providing the austenitic steel pipe and the ferritic steel pipe, such that an inner end section of the austenitic steel pipe has an outer diameter smaller than an inner diameter of an outer section of the ferritic steel pipe; inserting the inner end section into the outer end section, such that the inner and outer end sections overlap in a connection region; and welding the inner and outer end sections in the connection region by explosive welding or magnetic pulse welding.

According to the method of the present invention the connection of the pipes is established by welding the end sections in the connection region, which extends along the length of the connection region. The weld is positioned between the inner and the outer end sections, such that the weld is protected by the inner end section from direct contact with hot cracked gas, thereby preventing corrosion of the weld. Additionally, due to the extension of the weld along the length of the connection region, the weld extends across a relatively huge surface area, leading to an increased strength of the connection. These effects cannot be achieved with a butt welding of the two pipes, for comparison.

The length of the connection region can be adjusted or selected according to the specific requirements (materials of the pipes, temperature, temperature drop, . . . ); for example as required by the specific application.

The term 'austenitic steel pipe' is to be understood in the sense of a pipe made of an austenitic steel; similarly, the term 'ferritic steel pipe' is to be understood in the sense of a pipe made of a ferritic steel.

Preferably the method comprises providing the inner and/or outer end sections with grooves in the step of providing the austenitic and ferritic steel pipes. With grooves the strength of the bonding between the two end sections of the pipes can be increased.

Further, the method preferably comprises forming a chamfer at an edge of the austenitic and/or ferritic steel pipe, preferably of the austenitic steel pipe; and/or forming a protrusion on a surface of the austenitic and/or ferritic steel pipe, preferably on an inner surface of the ferritic steel pipe. Chamfers and/or protrusions, when formed accordingly, can suppress turbulence at the connection in a fluid flowing through the connected pipes.

Preferably the method comprises forming a cooling channel on an outer surface of the ferritic steel pipe in radially overlapping relation with the connection region. That is, the cooling channel is formed at least partially on an outer surface of the outer end section.

Preferably, the ferritic steel pipe is provided, such that a reduced section adjacent to the outer end section has an inner diameter smaller than the outer diameter of the inner end section, wherein particularly the inner diameter of the reduced section is chosen, such the inner diameters of the reduced and inner end sections are equal after the step of welding. This allows to reduce or to avoid a step between the inner diameters of the pipes.

A material of the austenitic steel pipe is preferably a highly heat resistant steel, particularly selected from X10NiCrAlTi32-20 (material no. 1.4876), X5NiCrAlTi31-20 (1.4958), X8NiCrAlTi32-21 (1.4959) or equivalent materials from other standards, e.g. Alloy 800 (UNS N08800), Alloy 800H (UNS N08810), Alloy 800HT (UNS N08811). Independently, a material of the ferritic steel pipe is preferably a heat resistant steel, particularly selected from 16Mo3 (1.5415), 13CrMo4-5 (1.7335), 10CrMo9-10 (1.7380) or equivalent materials from other standards, e.g. C-½ Mo (T1, T1a, T1b), 1¼ Cr-½Mo—Si (T11), 1Cr ½ Mo (T12), 3Cr-1Mo (T21), 21/4Cr-1Mo (T22).

A linear quench exchanger according to the invention has a double pipe, wherein an inner ferritic steel pipe of the double pipe is connected with an austenitic steel pipe by a method according to the invention.

The linear quench exchanger has preferably a cooling channel for a cooling fluid extending in circumferential direction, wherein the cooling channel is positioned in radially overlapping relation with the connection region on an outside of the ferritic inner steel pipe (i.e. on an outside of the outer end section). A cooling channel allows maintaining the connection region in an advantageous temperature range (when provided with a suitable cooling fluid). For example, diffusion processes in the connection region can be influenced by controlling the temperature.

A processing arrangement (for processing a process fluid) according to the invention has a furnace, preferably a steam cracking furnace, and a linear quench exchanger according to the invention, wherein the austenitic steel pipe is or is connected to an outlet pipe of the furnace.

In the processing arrangement a chemical reaction in a process fluid can be caused by heating the process fluid to a corresponding temperature in the furnace. The furnace has typically coils and/or pipes through which the process fluid flows and in which the heating takes place. Upon undergoing the chemical reaction the process fluid exits the furnace through an outlet pipe which is typically of highly heat resistant austenitic steel. From the outlet pipe the process fluid is guided through the linear quench exchanger to be cooled.

SHORT DESCRIPTION OF THE FIGURES

The invention can be more fully understood by the subsequent description, in which reference is made to the accompanying drawings, wherein.

DETAILED DESCRIPTION OF THE FIGURES

Figure 1A:
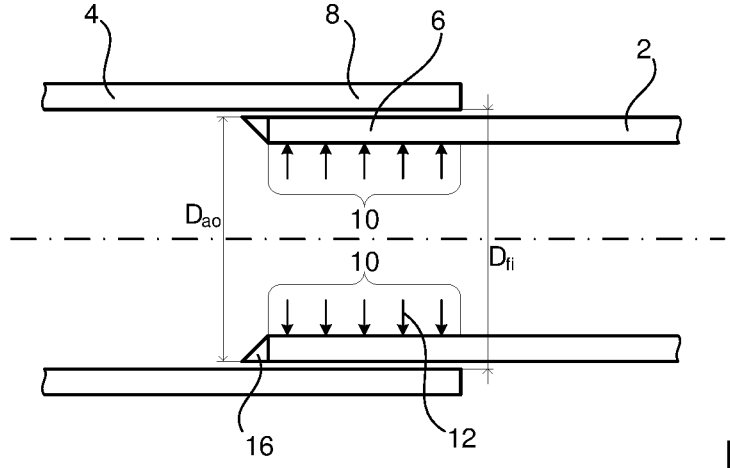
FIGS. 1A and 1B illustrate the method of connecting austenitic and ferritic steel pipes according to an embodiment of the present invention prior and after establishing the connection.
Figure 1B:
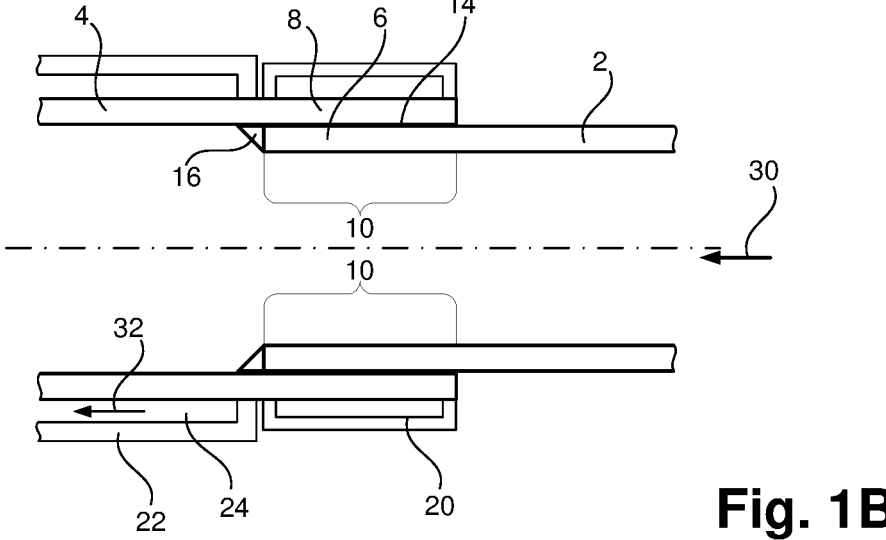

FIGS. 1A and 1B illustrate the method of connecting austenitic and ferritic steel pipes according to an embodiment of the invention prior and after establishing the connection. In FIG. 1A a pipe 2 having as material an austenitic steel (denoted austenitic steel pipe 2) and a pipe 4 having as material a ferritic steel (denoted ferritic steel pipe 4) are shown in a cross-sectional view. The cross section is along the length of the pipes, i.e. the length axis of the pipes lies within the sectional plane. The length axis is the axis of rotational symmetry of the pipes; radial directions are directions orthogonal to the length axis. In the figures the pipes are assumed to be rotationally symmetric, i.e. to have the shape of cylinder barrels. Of course, the method may also be applied to non-circular pipes, e.g. oval pipes.

An end section, denoted as inner end section 6, of the austenitic steel pipe 2 is inserted into an end section, denoted as outer end section 8, of the ferritic steel pipe 4. Both end sections are adjacent to an edge at the end of the respective pipe. The outer diameter $D_{ao}$ of the inner end section 6 of the austenitic steel pipe 2 is smaller than an inner diameter $D_{fi}$ of the outer end section 8 of the ferritic steel pipe 4, in order to allow the insertion. The inner and outer end sections 6, 8 overlap each other (radially) in a connection region 10, which extends along the circumference of the end sections.

As indicated by arrows 12, in the connection region 10 an impulse is generated that accelerates the inner end section 6 to a high velocity towards the outer end section 8. Upon impact the surfaces of both metals are plasticized, causing them to come into close contact sufficient to create a weld. The impulse is generated by a chemical explosive or by a magnetic pulse. The corresponding welding processes are called explosive welding and magnetic pulse welding, respectively. The outer diameter $D_{ao}$ of the inner end section 6 and the inner diameter $D_{fi}$ of the outer end section 8 are arranged in order to allow this welding process, i.e. the difference between the two diameters $D_{ao}$, $D_{fi}$ is in a range which allows explosive welding and/or magnetic pulse welding.

While in the embodiment shown in FIG. 1A the inner end section is accelerated outwards, it is alternatively or additionally also possible to accelerate the outer end section inwards towards the inner end section (not shown).

FIG. 1B shows the state after the welding, i.e. after the explosive welding or magnetic pulse welding. The inner and outer end sections 6, 8 are now connected to each other by a weld 14 in the connection region 10, thereby connecting the austenitic and ferritic pipes 2, 4.

Further, preferably a cooling channel 20 for a cooling fluid, e.g. water, is provided. The cooling channel 20 is arranged in radially overlapping relation with the connection region 10 and extends at least partially in circumferential direction, i.e. around the pipes. The cooling fluid is provided through one or more inlets and one or more outlets (not shown). The cooling channel 20 facilitates maintaining a desired temperature at the connection region 20, in order to further decrease wear and breakdown of the connection between the austenitic and ferritic pipes.

Additionally, an outer pipe 22 that has an inner diameter greater than the outer diameter of the ferritic steel pipe 4 is shown. The outer pipe may be of ferritic steel. The ferritic steel pipe 4 together with the outer pipe 22 form the double pipe of a double pipe heat exchanger. A cooling fluid, e.g. water, can be guided through the cooling jacket 24 of the double pipe heat exchanger, i.e. through the space between the ferritic steel pipe 4 and the outer pipe 22, for heat exchange. Again, inlets and outlets for guiding the cooling fluid into and out of the cooling jacket 24 are provided (not shown). Typically, the cooling fluid is guided in longitudinal direction, as indicated by an arrow 32.

While in FIG. 1B the cooling channel 20 is shown as not being connected to the cooling jacket 24, it is possible to connect the cooling channel 20 and the cooling jacket 24. Particularly, a combined cooling channel/jacket may be formed. In this case the cooling fluid is the same for the cooling channel and the cooling jacket. For example, the cooling fluid may be introduced into the cooling channel and flow from there into the cooling jacket.

The austenitic steel pipe 2 may be an outlet pipe of a steam cracking furnace (not shown), i.e. directly or indirectly over a header connected to at least one furnace coil or pipe in which the process fluid is heated. The cracked gas 30 exits the furnace in a hot state (e.g. greater than 700° C.) and is cooled in the double pipe heat exchanger.

Additionally a circumferential chamfer 16 may be arranged at an edge of the austenitic pipe 2, which is at the end of the pipe at which the inner end section is positioned. The chamfer 16 prevents the formation of turbulence at the edge. Alternatively or additionally, a chamfer or protrusion may also be arranged the ferritic steel pipe 4, e.g. on the inside of the pipe adjacent to the outer end section.

Figure 2A:
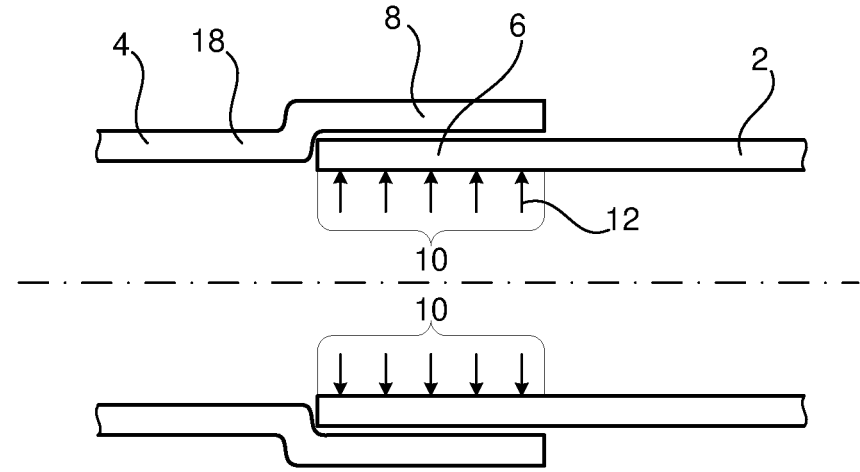
FIGS. 2A and 2B show a further embodiment of the present invention, in which the ferritic steel pipe has sections of different diameters.
Figure 2B:
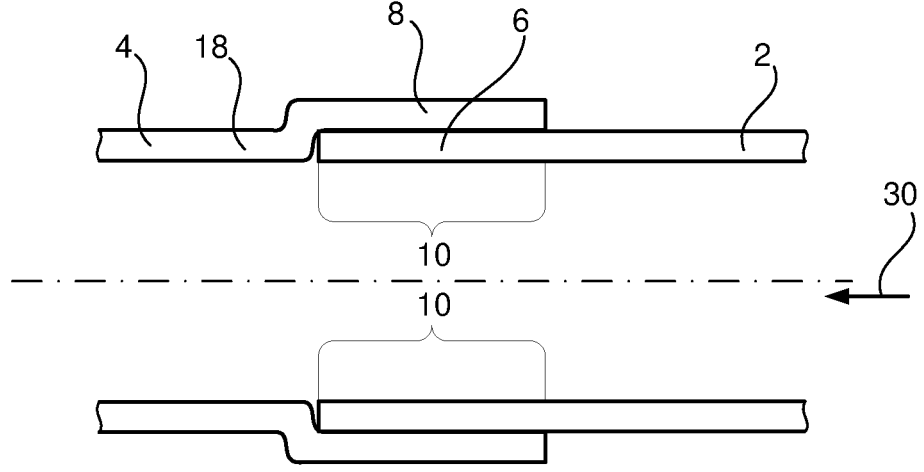

FIGS. 2A and 2B show a further embodiment of the present invention, in which the ferritic steel pipe has sections of different diameters. This embodiment is similar to the embodiment of FIGS. 1A and 1B; in particular, FIG. 2A shows the state prior to welding and FIG. 2B after welding. Thus, the description of common features (for which the same reference signs are used) is not repeated; cf. the description of FIGS. 1A and 1B in that regard. Differences will be explained in the following.

Instead of having a chamfer for avoiding turbulence, in the embodiment of FIGS. 2A and 2B the ferritic steel pipe 4 is provided with an outer end section 8 that has a greater diameter than a section, denoted as reduced section 18, of the ferritic steel pipe adjacent to the outer end section. The reduced section 18 has an inner diameter that is smaller (reduced) than the inner diameter of the outer end section and also smaller than the outer diameter of the inner end section. Such a shape can be produced, for example, during centrifugal casting the ferritic pipe or, after the production of the pipe, by roller spinning. The reduced section may extend over an arbitrary length of the ferritic pipe away from the outer end section; in principle over the complete length of the ferritic pipe with the exception of the outer section.

Particularly, the inner diameter of the reduced section 18 can be chosen, such that after the welding of the inner and outer end sections the inner diameters of the inner end section 6 and the reduced section 18 are equal. In this case, as shown in FIG. 2B, a basically smooth transition can be achieved from the austenitic pipe to the ferritic pipe without a step on the inside of the connected pipes. It is also possible to provide additionally a chamfer and/or protrusion, e.g. if the inner diameters of the inner end section 6 and the reduced section 18 are not equal after welding.

The outer pipe of the double pipe heat exchanger and the optional cooling channel are not shown in FIG. 2B. They can be arranged as shown in FIG. 1B.

Figure 3:
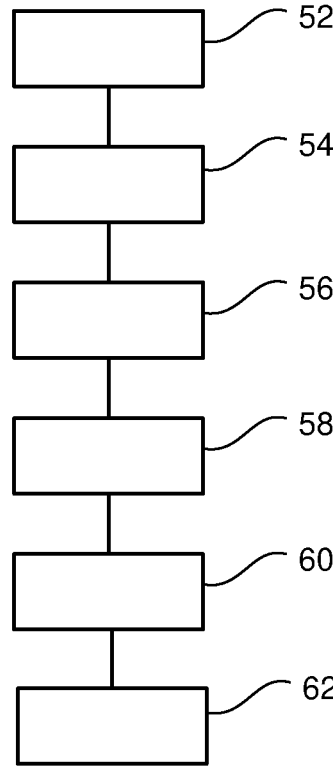
FIG. 3 is a flowchart illustrating the method of connecting austenitic and ferritic steel pipes according to a preferred embodiment of the invention.

FIG. 3 is a flowchart illustrating the method of connecting austenitic and ferritic steel pipes according to a preferred embodiment of the invention.

In the embodiment an austenitic steel pipe and the ferritic steel pipe are provided in step 52, such that an inner end section of the austenitic steel pipe has an outer diameter smaller than an inner diameter of an outer section of the ferritic steel pipe. The provision of the austenitic and ferritic steel pipes may include (step 54) providing the inner and/or outer end sections with grooves. Also, the provision of the austenitic and ferritic steel pipes may include (step 56) forming a chamfer at an edge of the austenitic and/or ferritic steel pipe (preferably of the austenitic steel pipe) and, alternatively or additionally, providing the ferritic steel pipe, such that a reduced section adjacent to the outer end section has an inner diameter smaller than the outer diameter of the inner end section.

In step 58 the inner end section is inserted into the outer end section, such that the inner and outer end sections overlap in a connection region. Thereafter, in step 60, the inner and outer end sections are welded in the connection region by explosive welding or magnetic pulse welding, i.e. by accelerating the inner and/or outer end section towards each other by subjecting at least one of them to an impulse generated by explosion of a chemical substance or by a magnetic pulse.

While the invention has been described in terms of embodiments and examples in the preceding specification, the scope of the present invention is restricted by the appended claims, not by specific embodiments of the specification. It should be noted that elements of the different embodiments may be combined even if not explicitly stated.

The invention claimed is:

1. A method of connecting an austenitic steel pipe with a ferritic steel pipe, comprising:
   providing the austenitic steel pipe and the ferritic steel pipe, such that an inner end section of the austenitic steel pipe has an outer diameter smaller than an inner diameter of an outer section of the ferritic steel pipe;
   inserting the inner end section into the outer end section, such that the inner and outer end sections overlap in a connection region; and
   welding the inner and outer end sections in the connection region by explosive welding or magnetic pulse welding.

2. The method of claim 1, further comprising providing the inner and/or outer end sections with grooves in the step of providing the austenitic and ferritic steel pipes.

3. The method of claim 1, further comprising forming a chamfer at an edge of the austenitic and/or ferritic steel pipe.

4. The method of claim 1, further comprising forming a cooling channel on an outer surface of the ferritic steel pipe in radially overlapping relation with the connection region.

5. The method of claim 1, wherein the ferritic steel pipe is provided, such that a reduced section adjacent to the outer end section has an inner diameter smaller than the outer diameter of the inner end section.

6. The method of claim 1, wherein a material of the austenitic steel pipe is a highly heat resistant steel selected from X10NiCrAlTi32-20, 1.4876, X5NiCrAlTi31-20, 1.4958, X8NiCrAlTi32-21, 1.4959, or equivalent materials, and/or a material of the ferritic steel pipe is a heat resistant steel selected from 16Mo3, 1.5415, 13CrMo4 5, 1.7335, 10CrMo9-10, 1.7380, or equivalent materials.

7. A linear quench exchanger comprising: a double pipe, wherein an inner ferritic steel pipe of the double pipe is connected with an austenitic steel pipe by the method according to claim 1.

8. The linear quench exchanger of claim 7, having a cooling channel for a cooling fluid extending in circumferential direction, wherein the cooling channel is positioned in radially overlapping relation with the connection region on an outside of the ferritic inner steel pipe.

9. A processing arrangement comprising: a furnace and a linear quench exchanger according to claim 7, wherein the austenitic steel pipe is or is connected to an outlet pipe of the furnace.

10. The method of claim 1, further comprising forming a chamfer at an edge of the austenitic steel pipe.

11. The method of claim 1, further comprising forming a protrusion on a surface of the austenitic steel pipe and/or ferritic steel pipe.

12. The method of claim 1, further comprising forming a protrusion on an inner surface of the ferritic steel pipe.

13. The method of claim 1, wherein the ferritic steel pipe is provided, such that a reduced section adjacent to the outer end section has an inner diameter smaller than the outer diameter of the inner end section, wherein the inner diameters of the reduced and inner end sections are equal after the step of welding.

14. The method of claim 1, wherein a material of the austenitic steel pipe is a highly heat resistant steel selected from X10NiCrAlTi32-20, 1.4876, X5NiCrAlTi31-20, 1.4958, X8NiCrAlTi32-21, 1.4959, Alloy 800, UNS N08800, Alloy 800H, UNS N08810, Alloy 800HT, or UNS N08811.

15. The method of claim 1, wherein a material of the ferritic steel pipe is a heat resistant steel selected from 16Mo3, 1.5415, 13CrMo4 5, 1.7335, 10CrMo9-10, 1.7380, C-½ Mo (T1, T1a, T1b), 1¼ Cr ½Mo Si (T11), 1Cr ½ Mo (T12), 3Cr-1Mo (T21), or 21/4Cr-1Mo (T22).

16. A processing arrangement comprising: a steam cracking furnace and a linear quench exchanger according to claim 7, wherein the austenitic steel pipe is or is connected to an outlet pipe of the furnace.

17. The method of claim 1, wherein the weld is positioned between the inner and the outer end sections.

18. The method of claim 1, wherein the weld extends along the length of the connection region.

\* \* \* \* \*